(12) United States Patent
Hondier et al.

(10) Patent No.: US 8,201,847 B2
(45) Date of Patent: Jun. 19, 2012

(54) SAFETY ARRANGEMENT AND A METHOD OF ASSEMBLING A SAFETY ARRANGEMENT

(75) Inventors: Thierry Hondier, Servaville-Salmonville (FR); Rémi Baillivet, Dampierre-en-Bray (FR); Fréderic Langlois, Saumont la Poterie (FR); Samuel Vanzieleghem, Bosc Edeline (FR); Jérome Bertrand, Bernières sur Seine (FR)

(73) Assignee: Autoliv Development AB, Vargarda (SE)

( * ) Notice: Subject to any disclaimer, the term of this patent is extended or adjusted under 35 U.S.C. 154(b) by 491 days.

(21) Appl. No.: 12/304,228

(22) PCT Filed: Jun. 15, 2006

(86) PCT No.: PCT/SE2006/000708
§ 371 (c)(1),
(2), (4) Date: Nov. 24, 2009

(87) PCT Pub. No.: WO2007/145549
PCT Pub. Date: Dec. 21, 2007

(65) Prior Publication Data
US 2010/0059971 A1 Mar. 11, 2010

(51) Int. Cl.
*B60R 21/203* (2006.01)
(52) U.S. Cl. .................. 280/728.2; 280/731; 200/61.55
(58) Field of Classification Search ............... 280/728.2, 280/731, 728.1; 200/61.55, 61.54; 74/552; B60R 21/203, 21/215, 21/20; B62D 1/04
See application file for complete search history.

(56) References Cited

U.S. PATENT DOCUMENTS

| | | | |
|---|---|---|---|
| 4,374,310 A * | 2/1983 | Kato et al. | 200/61.54 |
| 5,738,369 A | 4/1998 | Durrani | |
| 6,719,323 B2 * | 4/2004 | Kai et al. | 280/731 |
| 7,053,322 B2 * | 5/2006 | Helmstetter et al. | 200/61.54 |
| 2002/0153709 A1 | 10/2002 | Abe | |
| 2002/0153714 A1 * | 10/2002 | Kreuzer | 280/731 |
| 2005/0236820 A1 | 10/2005 | Amamori | |

FOREIGN PATENT DOCUMENTS

| | | |
|---|---|---|
| EP | 1591326 A2 | 11/2005 |
| WO | WO 98/15431 A1 | 4/1998 |
| WO | WO 03/059703 A1 | 7/2003 |

* cited by examiner

*Primary Examiner* — Faye M Fleming
*Assistant Examiner* — Keith Frisby
(74) *Attorney, Agent, or Firm* — Harness, Dickey & Pierce, P.L.C.

(57) ABSTRACT

A safety arrangement includes an airbag housing, a cover and pair of horn contacts for actuating a vehicle horn. The airbag housing mounts to a steering wheel frame. The cover is resiliently mounted on the housing and spaced therefrom such that the cover may be depressed towards the housing to close the horn contacts. The housing and cover are hooked to one another for preventing subsequent disconnection of the cover from the housing upon release of the cover to open the horn contacts. A stop is mounted to one of the cover and the housing for movement between a operable position, in which the stop arrests relative movement of the cover and housing towards one another so as to prevent un-hooking of the cover from the housing, and an assembly position, in which the cover may be depressed sufficiently far towards the housing to allow un-hooking of the cover from the housing and consequent disconnection of the housing and cover upon release of the cover.

19 Claims, 9 Drawing Sheets

SAFETY ARRANGEMENT AND A METHOD OF ASSEMBLING A SAFETY ARRANGEMENT

CROSS-REFERENCE TO RELATED APPLICATIONS

This application is a 371 U.S. National Stage of International Application No. PCT/SE2006/000708, filed Jun. 15, 2006 and published in English as WO 2007/145549 A1 on Dec. 21, 2007.

FIELD

The present invention relates to a safety arrangement, and more particularly to a safety arrangement comprising an airbag housing for mounting to a steering wheel frame, a cover and a pair of horn contacts for actuating a vehicle horn, as well as a method for assembling such a safety arrangement.

BACKGROUND

It has been known for some time to provide a so called "driver air-bag" in a motor vehicle for deployment, during a crash situation, to offer a level of protection to the driver of the motor vehicle. Such driver air-bags are typically almost invariably stored, prior to deployment, in an air-bag housing mounted in the region of the hub of the steering wheel of the vehicle.

Typically, a cover is provided which attaches to the air-bag housing to cover the housing. The cover is generally designed to present a consistent external appearance with the remainder of the steering wheel, thereby giving a neat, "finished" appearance to the steering wheel. The cover may nevertheless be configured to allow deployment of an air-bag from within the air-bag housing; for example, the cover may be provided with one or more "split-lines" which together form a break-away panel in the cover, allowing deployment of the air-bag through the cover during a crash impact.

It has become increasingly common for at least a portion of the cover to be designed with the dual purpose of providing both an aesthetically pleasing outward appearance, whilst also functioning as a "push button" for the vehicle horn, allowing easy actuation of the vehicle horn in an emergency situation. In such arrangements, the cover is generally mounted to the air-bag housing by means of one or more spring elements and the cover and housing are, additionally, hooked to one another. Thus, the cover effectively "floats" on the housing and the cover may be depressed towards the housing, against the bias of the spring elements, to close the horn contacts and actuate the horn. Upon release of the cover after being depressed, the spring elements act to return the cover to its initial position prior to depression, whilst the hooking engagement between the cover and housing ensures that the cover and housing do not become disconnected as the cover returns to its initial position prior to depression.

In order to ensure that pushing of the cover does not allow the cover and housing to become unhooked from one another, the arrangement is configured such that movement of the cover towards the housing to actuate the horn is nevertheless insufficient to allow unhooking of the cover from the housing (and therefore insufficient to allow the cover and housing to be hooked to one another in the case where the cover and housing are initially separate during assembly). Thus, during assembly of the arrangement, the cover and housing must first be hooked together and the horn assembly subsequently mounted between the cover and housing. Mounting of the horn assembly in situ in this manner is relatively complicated, and therefore undesirably time consuming and expensive.

SUMMARY

It is an object of the present invention to seek to provide an improved safety arrangement.

According to one aspect of the present invention, there is provided a safety arrangement comprising:

an airbag housing for mounting to a steering wheel frame, a cover and a pair of horn contacts for actuating a vehicle horn, the cover being resiliently mounted on the housing and spaced therefrom such that the cover may be depressed towards the housing to close the horn contacts, the housing and cover further being hooked to one another for preventing subsequent disconnection of the cover from the housing upon release of the cover to open the horn contacts; wherein the arrangement comprises a stop mounted to the cover or housing for movement between a operable position, in which the stop arrests relative movement of the cover and housing towards one another so as to prevent un-hooking of the cover from the housing, and an assembly position, in which the cover may be depressed sufficiently far towards the housing to allow un-hooking of the cover from the housing and consequent disconnection of the housing and cover upon release of the cover.

Conveniently, a side wall of one of the cover and housing is provided with one or more apertures, and the other of said housing and cover is provided with a respective number of hook-shaped elements configured to engage with an edge of the respective aperture to hook the housing and cover to one another.

Preferably, one of said horn contacts is carried on a resilient arm fixedly mounted with respect to the housing, the cover being supported on the resilient arm, whereby the cover is resiliently mounted to the housing, the resilient arm being configured such that, upon depression of the cover the resilient arm is pressed towards the housing to close said horn contacts, said resilient arm further acting to open the horn contacts upon release of the cover, thereby forcing the cover away from the housing.

Optionally, the stop is biased towards said operable position.

Preferably, the stop is biased by means of a coil spring.

Optionally, the stop is mounted for lateral movement between said operable and assembly positions.

Preferably, the stop is slidably mounted to the cover or housing for lateral sliding movement between said operable position and said assembly position.

Conveniently, the stop is in the form of a carriage slidably mounted to the housing for lateral sliding movement between said operable position and said assembly position, a first horn contact being mounted on the carriage.

Preferably, the other of said horn contacts is carried on a resilient arm fixedly mounted to the carriage, the resilient arm supporting said cover when said carriage is in the operable position, whereby the cover is resiliently mounted to the housing, the resilient arm being configured such that, upon depression of the cover with the carriage in said operable position, the resilient arm is pressed towards the housing to close said horn contacts, said resilient arm further acting to open the horn contacts upon release of the cover, thereby forcing the cover away from the housing.

Optionally, the stop is mounted for movement along the axis of depression of said cover.

Conveniently, the stop is biased toward said operable position to arrest relative movement of the cover towards the housing upon depression of the cover during normal operation to activate said vehicle horn, the strength of said biasing nevertheless allowing relative movement of the cover and housing toward one another, upon sufficient application of force to depress the cover, whereby the stop may be forcibly moved into said assembly position, against said biasing, for disconnection of the cover and housing.

Preferably, stop is in the form of a retractable actuator element mounted to one of said housing or cover, the retractable actuator element being biased towards a non-retracted operable position projecting between the housing and cover, and forcibly retractable into the assembly position, against the action of said bias.

Optionally, the actuator element is mounted to the cover and biased towards said non-retracted position by means of a coil spring, one of said horn contacts being carried on a resilient arm fixedly mounted to the housing, the actuator element being supported on the resilient arm, whereby the cover is resiliently mounted to the housing, the resilient arm being configured such that, upon depression of the cover the resilient arm is pressed towards the housing by the actuator element to close said horn contacts, said resilient arm further acting to open the horn contacts upon release of the cover, thereby forcing the actuator element and cover away from the housing.

Conveniently, the stop is in the form of an abutment member pivotally mounted to the housing, the abutment member being biased towards said operable position, and forcibly pivotable into said assembly position, against the action of said bias.

Optionally, the abutment member is biased towards said operable position by means of a coil spring, one of said horn contacts being carried on a resilient arm fixedly mounted to the abutment member, the cover being supported on the resilient arm whereby the cover is resiliently mounted to the housing, the resilient arm being configured such that, upon depression of the cover the resilient arm is pressed towards the housing by the cover to close said horn contacts, said resilient arm further acting to open the horn contacts upon release of the cover, thereby forcing the cover away from the housing.

Conveniently, the housing incorporates a mounting base, distal from said cover, for mounting the arrangement to a given steering wheel frame, the cover incorporating a side wall which extends downwardly alongside the airbag housing and terminates at a lower edge, said lower edge being spaced a distance above the mounting base such that, when the arrangement is mounted to the steering wheel frame, said lower edge of said side wall acts as a secondary stop by abutting against the steering wheel frame upon sufficient depression of the cover towards the housing, thereby preventing said un-hooking of the cover and housing.

Preferably, the arrangement further comprises a locking mechanism for locking the stop in said operable position.

According to another aspect of the present invention, there is provided a method of assembling a safety arrangement comprising an airbag housing for mounting to a steering wheel frame, a cover and a pair of horn contacts for actuating a vehicle horn, the method comprising the steps of:
  a) providing one of said housing or cover with a moveable stop;
  b) with the stop in an assembly position, hooking the cover to the housing to prevent disconnection of the cover from the housing; and
  c) subsequently moving the stop into an operable position wherein, with the stop in said operable position, the cover is resiliently mounted to the housing for depression towards the housing to close the horn contacts, wherein the stop nevertheless arrests relative movement of the cover and housing towards one another so as to prevent un-hooking of the cover from the housing.

DRAWINGS

So that the invention may be more readily understood and so that further features thereof may be appreciated, embodiments of the invention will now be described, by way of example, with reference to the accompanying drawings in which.

DETAILED DESCRIPTION

Figure 1:
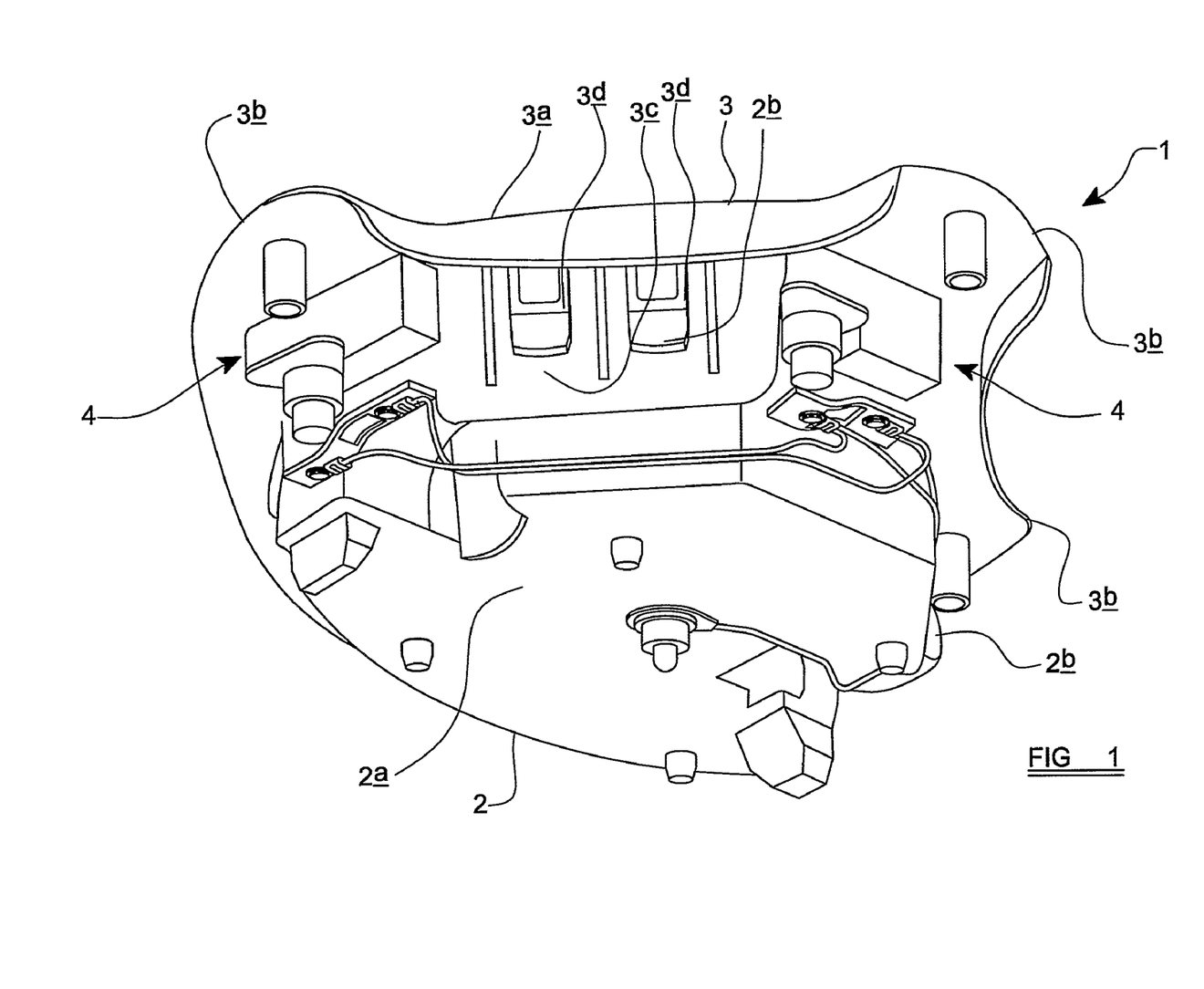
FIG. 1 is a perspective view showing a first embodiment of safety arrangement according to the present invention.

FIG. 1 shows a safety arrangement 1 comprising an airbag housing 2, configured to contain a folded airbag (not shown), and a cover 3.

As can be seen from FIG. 1, the specific external shape of the airbag housing 2 is somewhat complex, to enable the housing 2 to accommodate various components associated with deployment and control of the airbag. A detailed description of the specific shape of the housing 2 is not necessary for a full understanding of the present invention. Suffice to say, for the time being, that the housing 2 has a generally triangular cross-section and incorporates a mounting base 2a, which allows the housing 2 to be mounted to a given steering wheel (not shown), and two pairs of downwardly directed hook-elements 2b (of which only one pair can be seen clearly in FIG. 1) provided on respective sidewalls of the housing 2 (see also FIG. 2).

The cover 3 comprises a generally triangular, planar body portion 3a defining three "lobes" 3b, and a pair of side walls 3c (of which only one is shown in FIG. 1), each sidewall 3c extending downwardly from the periphery of the body portion 3a between a respective pair of the lobes 3b, and incorporating a pair of generally rectangular apertures 3d which receive the respective hook-elements 2b therethrough in a snap-fit to hook the cover 3 to the housing 2. It will be appreciated that, with the hook elements 2b engaged with the lower edge of the respective apertures 3d, the cover 3 and housing 2 are prevented from being pulled apart from one another.

The cover 3 may, for example, be formed of any suitable plastics material, and is preferably formed to match the relevant steering wheel on which the housing is mounted. In this manner, it will be appreciated that the lobes 3b are configured such that when the housing is mounted at the hub of a suitable steering wheel frame comprising three spokes, the lobes will align with the spokes to create a neat finish to the hub region of the steering wheel.

Still referring to FIG. 1, the safety arrangement 1 is further provided with three identical horn assemblies, of which two are indicated generally at 4 in FIG. 1 (the third horn assembly being obscured in FIG. 1 by the housing 2).

Figure 2:
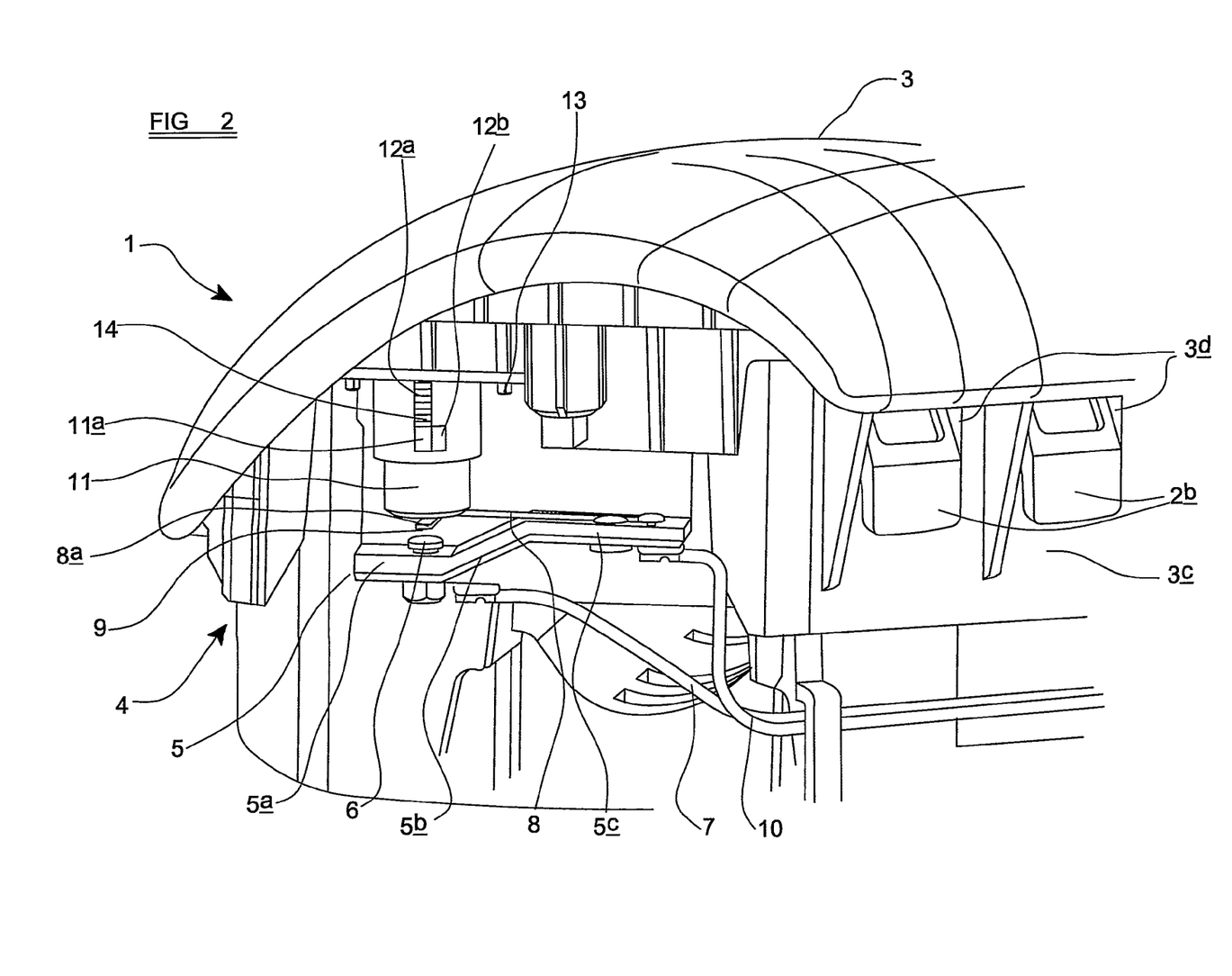
FIG. 2 is a perspective view showing part of the safety arrangement of FIG. 1.

Referring to FIG. 2, one of the horn assemblies 4 is shown in more detail.

The horn assembly 4 comprises a stepped support platform 5 projecting outwardly from the main body of the housing portion 2 and comprising a lower tier 5a extending generally horizontally along the main body of the housing 2, a sloping step portion 5b extending upwardly from one end of the lower tier portion 5a, and an upper tier portion 5c extending generally horizontally from the upper end of the sloping portion 5b, generally parallel with the lower tier 5a.

A first horn contact 6 is mounted on the upper surface of the lower tier portion 5a of the support platform 5, the first horn contact being connected to a horn activation circuit (not shown) by means of a wire 7.

A resilient arm 8, here in the form of a thin resilient strip of metal, is mounted to the upper surface of the upper tier portion 5c of the support platform 5, the resilient arm 8 extending generally horizontally over the lower tier 5a and terminating at a free end 8a spaced directly above the first horn contact 6. The resilient arm 8 carries a second horn contact 9, mounted to the free end 8a of the resilient arm 8, the second horn contact 9 being connected to the aforementioned horn activation circuit by means of a wire 10.

The horn contacts 6, 9 therefore represent a pair of horn contacts which may be closed (that is, brought into contact with one another) to close the associated horn circuit and activate the vehicle horn.

Referring again to FIG. 2, the resilient arm 8 in turn supports a retractable actuator element in the form of a generally cylindrical member 11 positioned directly above the horn contact 6 and extending upwardly towards the underside of the cover 3. The cylindrical member 11 is slidably received in the manner of a piston, within a corresponding generally cylindrical boss 12 which is fixedly attached to the underside of the cover 3, by means of bolts 13.

The cylindrical member 11 is retained within the boss 12 by means of a key 11a provided on the cylindrical member 11, the key 11a being slidably received within a corresponding blind key-way 12a extending part-way down the wall of the boss portion 12. A locking mechanism is provided at the lower end of the key-way 12a, the locking mechanism comprising a recess 12b cut-out from the key-way 12a, whereby the cylindrical member 11 may be locked in the non-retracted position by rotating the cylindrical member 11 within the boss 12 such that the key 11a engages the cut-out recess in the key-way 12a.

A coil spring 14 is provided within the boss portion 12 to bias the cylindrical member towards a non-retracted position (whereby the key 11a abuts against the lower edge of the blind key-way 12a), the cylindrical member being slidable against the bias of the coil spring 14 into a retracted position within the boss 12.

It will be appreciated that, provided the resilience of the coil spring is significantly greater than the resilience of the resilient arm 8, the cover 3 is effectively resiliently supported by the resilient arm 8 (via the cylindrical member 11) so that the cover 3 is resiliently mounted on the housing. Thus, if a plurality of horn assemblies is provided (such that there is a respective plurality of resilient arms) the cover will effectively "float" directly on the corresponding plurality of resilient arms.

Figure 3A:
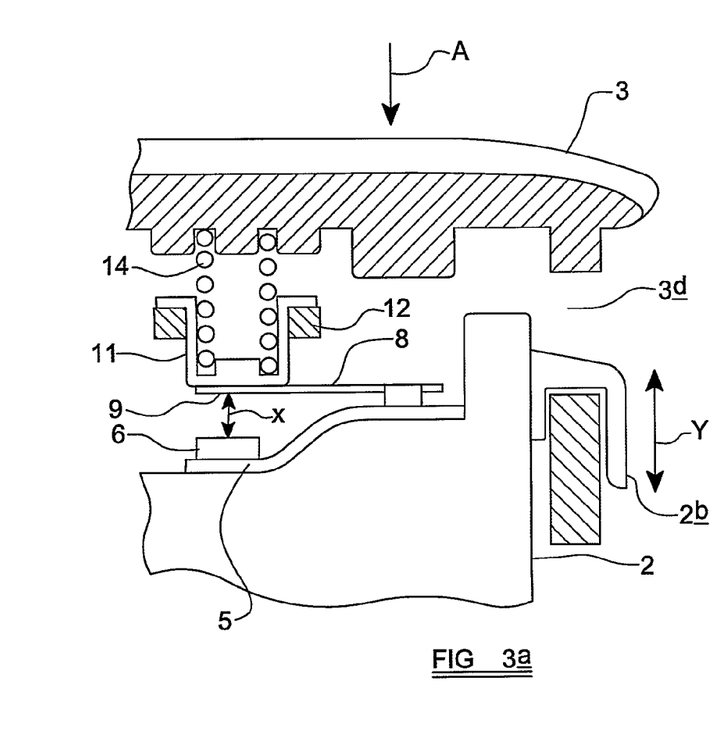
FIGS. 3A, 3B AND 3C are schematic, cross-sectional views illustrating aspects of operation of the safety arrangement of FIG. 1.
Figure 3B:
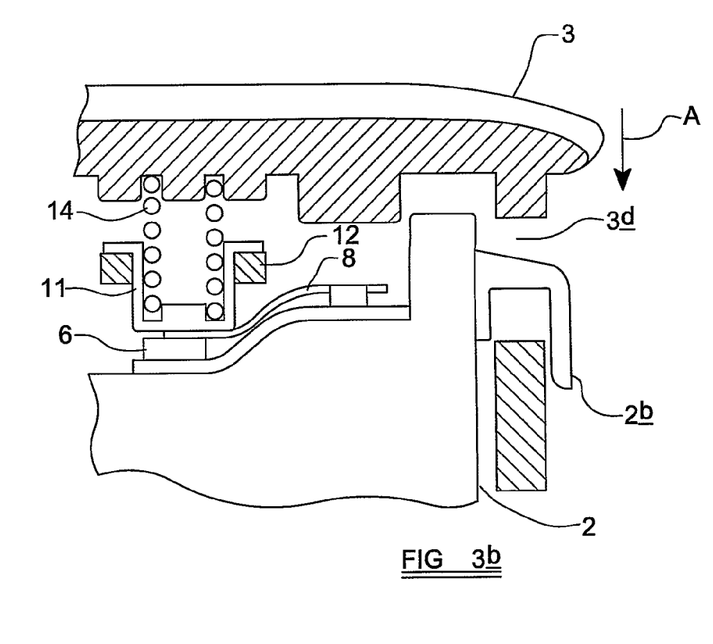
Figure 3C:
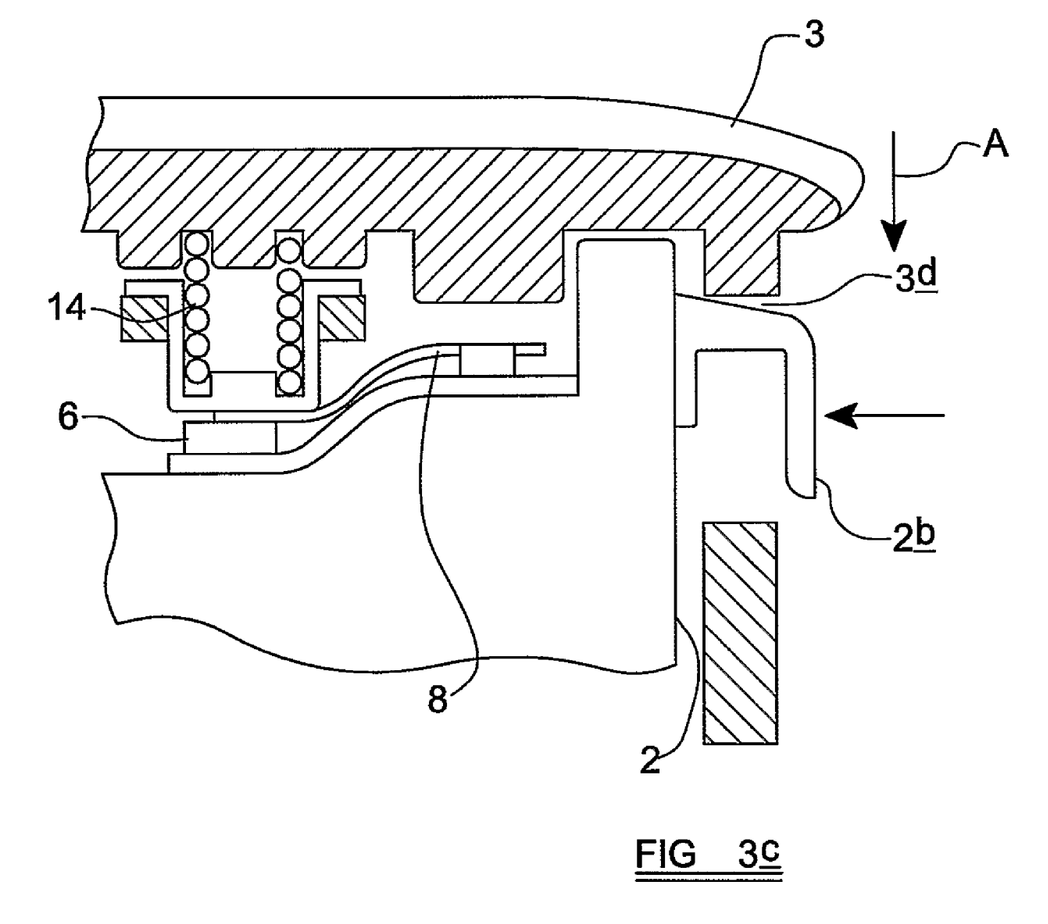

Turning to FIGS. 3a, 3b and 3c, the operation of the safety assembly shown in FIGS. 1 and 2 will now be described. It is to be noted that FIGS. 3a, 3b and 3c are intended only as schematic representations illustrating operation of the safety arrangement in accordance with the present invention. Thus, certain features shown in FIGS. 1 and 2 have been greatly simplified or stylized for clarity; in particular, in FIGS. 3a, 3b and 3c, the pair of hook elements 2b is shown in the same cross section as the horn assembly 4, in contrast to the actual relative position of the hook elements 2b and horn assembly 4 shown in FIGS. 1 and 2.

Referring first of all to FIG. 3a, the safety arrangement is shown, in part, prior to depression of the cover 3 to activate the horn, with cover 3 resiliently mounted on the resilient arm 8, by means of the non-retracted cylindrical member 11.

In order to activate the horn, a vehicle occupant will depress the cover 3, as indicated by the arrow A in FIG. 3a. Upon such depression of the cover 3, the cylinder member 11 presses down on the resilient arm 8 and, provided the coil spring is selected to be sufficiently 'strong' (relative to the resilient arm 8), the cylinder member 11 bends the resilient arm 8 downwardly to move the horn contact 9 into engagement with the horn contact 6, as shown in FIG. 3b, thereby closing the horn contacts 6,9 and activating the vehicle horn.

Referring to FIGS. 3a and 3b, it will be appreciated that, as the distance x between the open horn contacts 6,9 is less than the distance y between the lower end of the hooks 2b (of which only one is shown in FIGS. 3a-3c), depression of the cover 3 a distance x to close the horn contacts 6,9 will not be sufficient to allow un-hooking of the cover 3 and housing 2 (as the hook elements 2b are obstructed by the lower edge of the respective apertures 3d). Moreover, referring to FIG. 3b, it will be appreciated that, provided the coil spring is selected to be sufficiently strong to resist any compression under the typical pressing force associated with normal operation of the vehicle horn, the cylindrical member 11 will act as a stop, arresting further movement of the cover 3 towards the housing 2, beyond the aforementioned distance x. In this manner, it is to be appreciated that the cylindrical member 11 acts as a stop which, in the operable (non-retracted) position shown in FIGS. 3a and 3b, arrests relative movement of the cover 3 towards the housing 2 so as to prevent un-hooking of the cover 3 from the housing 2.

FIG. 3c illustrates operation of the safety arrangement to specifically allow un-hooking of the cover 3 from the housing 2.

Thus, in the case where it is specifically desired to un-hook the cover 3 from the housing 2, sufficient downward force (greater than any force associated with normal operation of the vehicle horn) may be applied to the cover 3 to compress the coil spring 14 between the cover 3 and the housing 2 (after the horn contacts 6,9 are initially closed), thereby forcibly retracting the cylindrical member 11, relative to the cover 3, into an assembly position as shown in FIG. 3c.

In the assembly position shown in FIG. 3c, the lower edges of the apertures 3d have been moved to a position whereby they no longer obstruct the lower edges of the respective hook elements 2b, and the hook elements 2b may therefore be withdrawn through the respective apertures 3d to un-hook the cover 3 and housing 2 from one another. Un-hooking of the cover 3 and housing 2 in this manner allows disconnection of the cover 3 from the housing 2.

It is to be appreciated that, although the operation of the safety arrangement shown in FIGS. 1 to 3 has been described with reference to disconnecting the cover 3 and housing 2, the safety arrangement shown in FIGS. 1 to 3 would equally permit convenient assembly of the cover 3 to the housing 2.

Thus, where it is desired to mount the cover 3 to the housing 2, the cover 3 may first be resiliently mounted on the housing 2 by locating the cylindrical member 11 on the respective resilient arm 8, such that the cover 3 "floats" on the housing 2. The cover 3 may then be depressed towards the housing 2 in the manner described above, using sufficient force to forcibly retract the cylindrical member 11 into the assembly position, whereby the cover 3 and housing 2 may be conveniently hooked to one another (via hook elements 2b and apertures 3d). Once the cover 3 and housing 2 have been hooked to one another, the cover may then be released to adopt the position shown in FIG. 3a, after which time the safety arrangement may be operated in accordance with FIGS. 3a to 3c, as set out above. Here it is to be noted that, due to the moveable stop (in this case the retractable cylinder 11), the cover 3 and housing 2 can be mounted to one another with the horn assembly 4 already assembled and mounted to the housing, thereby preventing the need to build the horn assembly 4 in situ after hooking of the cover 3 to the housing 2.

Figure 4:
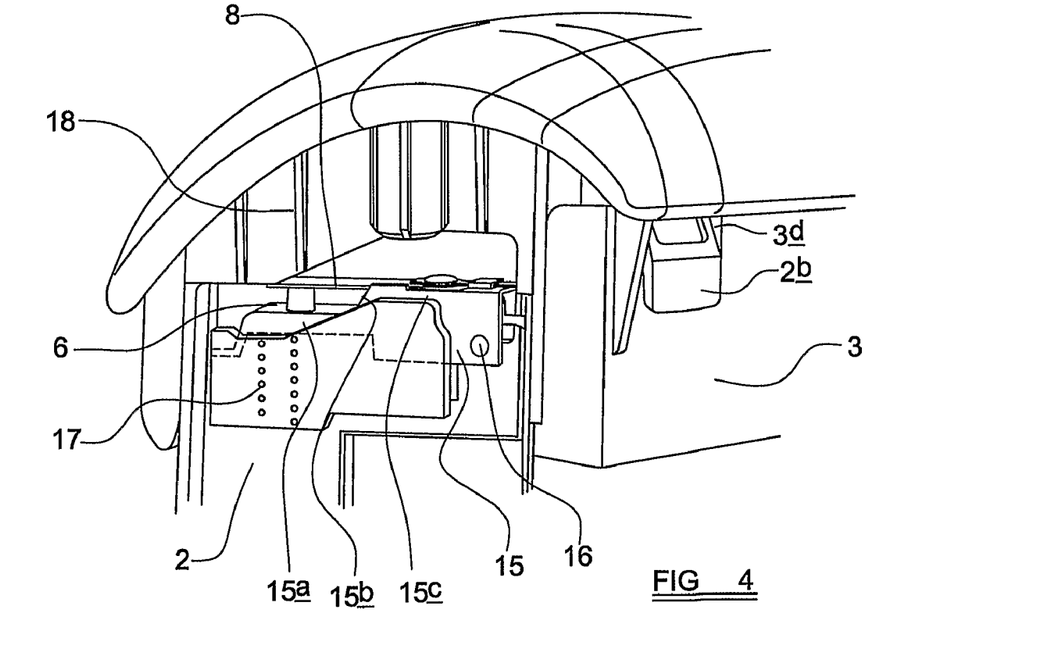
FIG. 4 is a perspective view showing a further embodiment of a safety arrangement according to the present invention.

Referring now to FIG. 4, a yet further embodiment of a safety arrangement is shown.

The embodiment shown in FIG. 4 is similar in some respects to the embodiment already described with reference to FIGS. 1 to 3, and for clarity the same reference numerals have therefore been used to denote common features.

Thus, referring to FIG. 4, an abutment member in the form of an elongate element 15 is pivotally mounted to the housing 2 at a pivot point 16, the elongate element 15 being biased towards an operable, generally horizontal position by means of a coil spring 17 (see also FIGS. 4a and 4b), which engages with the underside of the elongate element 15 remote from the pivot point 16. A locking mechanism may be provided, for example in the form of catch (See FIG. 5a), to lock the elongate element 15 in the operable position.

The upper surface of the elongate element 15 incorporates a lower tier 15a extending generally horizontally along the main body of the housing 2, a sloping step portion 15b extending upwardly from one end of the lower tier portion 15a, and an upper tier portion 15c extending generally horizontally from the upper end of the sloping portion 15b, generally parallel with the lower tier 15a.

A horn contact 6 is mounted on the lower tier 15a of the upper surface of the elongate element 15, the horn contact 6 being connected to a horn activation circuit (not shown) by means of a wire. A resilient arm 8 is mounted on the upper tier 15c of the upper surface of the elongate element 15, the resilient arm 8 extending generally horizontally over the lower tier 15a and terminating at a free end 8a spaced directly above the first horn contact 6. The resilient arm 8 carries a second horn contact 9, mounted to the free end 8a of the resilient arm 8, the second horn contact 9 being connected to the aforementioned horn activation circuit by means of a wire.

Still referring to FIG. 4, the resilient arm 8 directly supports the underside 18 of the cover 3.

It will be appreciated that, provided the resilience of the coil spring 17 is significantly greater than the resilience of the resilient arm 8, the cover 3 is effectively resiliently supported by the resilient arm 8. Thus, the cover 3 is resiliently mounted on the housing 2 and, where a plurality of such horn assemblies is provided (such that there is a respective plurality of resilient arms) the cover 3 will effectively "float" directly on the corresponding plurality of resilient arms.

Figure 5A:
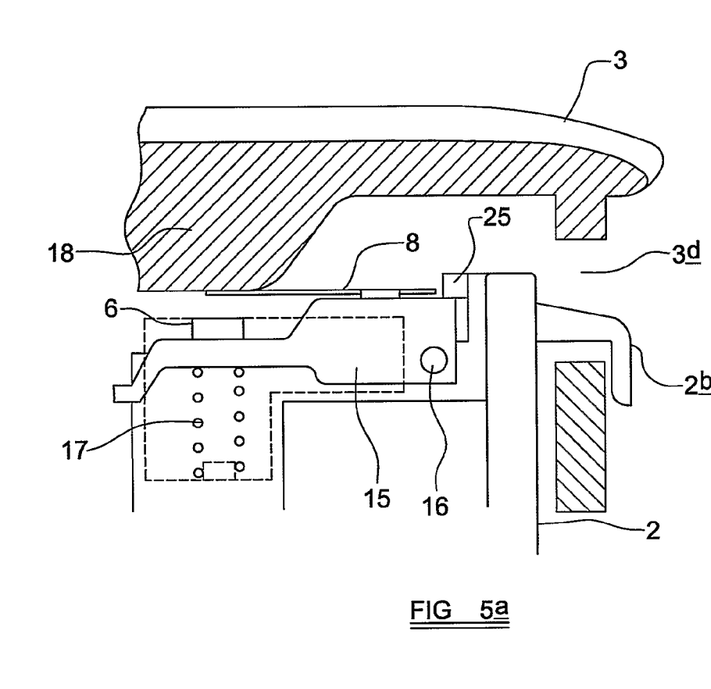
FIGS. 5A AND 5B are schematic, cross-sectional views illustrating aspects of operation of the safety arrangement of FIG. 4.
Figure 5B:
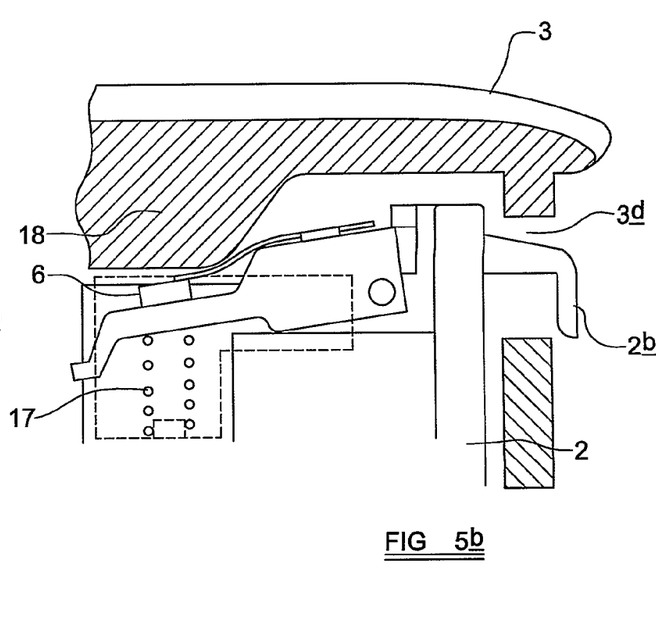

Turning to FIGS. 5a and 5b, the operation of the safety assembly shown in FIG. 4 will now be described. FIGS. 5a and 5b are intended only as schematic representations illustrating operation of the safety arrangement in accordance with the present invention. Thus, certain features shown in FIGS. 5a and 5b have been greatly simplified or stylized for clarity.

Referring first of all to FIG. 5a, the safety arrangement is shown, in part, prior to depression of the cover 3 to activate the horn, with cover 3 resiliently mounted on the resilient arm 8.

Upon resilient depression of the cover 3, the underside 18 of the cover 3 presses down on the resilient arm 8, bending the resilient arm 8 downwardly to move the horn contact 9 into engagement with the horn contact 6. Provided the coil spring 17 is selected to be sufficiently strong (relative to the resilient arm 8), the underside 18 of the cover 3 bends the resilient arm 8 downwardly to move the horn contact 9 into engagement with the horn contact 6, thereby closing the horn contacts 6,9 and activating the horn.

It will be appreciated once again that depression of the cover 3 to close the horn contacts 6,9 will not be sufficient to allow unhooking of the cover 3 and housing 2 (as the hook elements 2b are obstructed by the lower edge of the respective apertures). Moreover, it will be appreciated that, provided the coil spring 17 is selected to be sufficiently strong to resist any compression under the typical pressing force associated with normal operation of the vehicle horn, the elongate element 15 will arrest further movement of the cover 3 towards the housing 2. In this manner, it is to be appreciated that the elongate element 15 acts as a stop which, in the operable (horizontal) position shown in FIG. 5a, arrests relative movement of the cover 3 towards the housing 2 so as to prevent un-hooking of the cover 3 from the housing 2.

FIG. 5b illustrates operation of the safety arrangement to specifically allow un-hooking of the cover 3 from the housing 2.

Figure 7A:
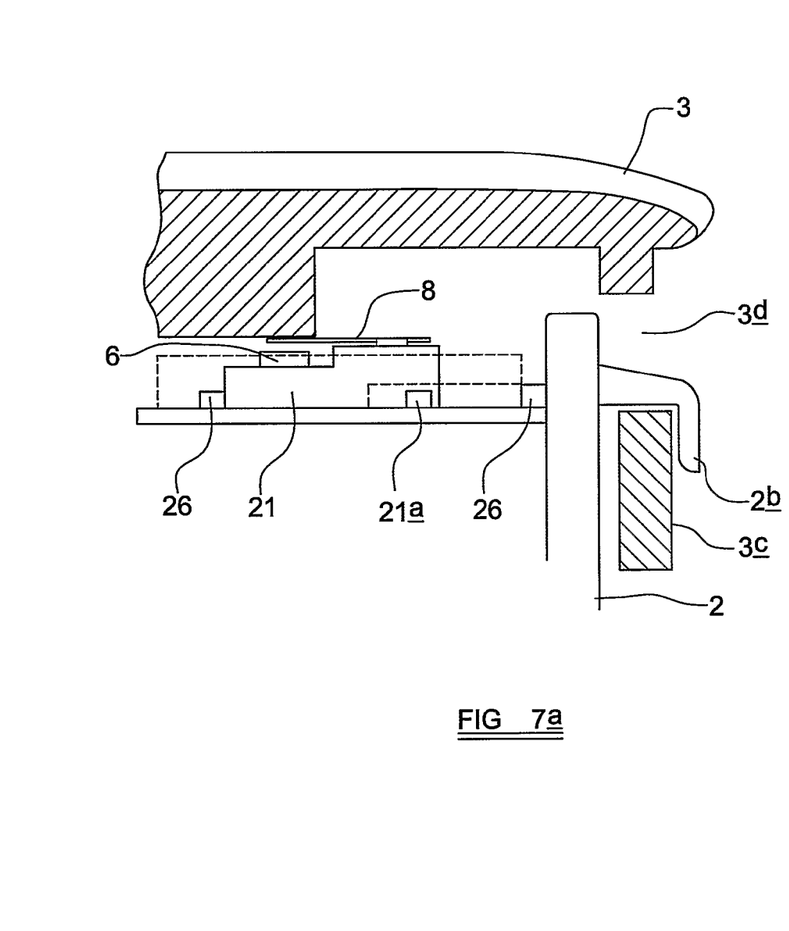
FIGS. 7A AND 7B are schematic, cross-sectional views illustrating aspects of operation of the safety arrangement of FIG. 6.
Figure 7B:
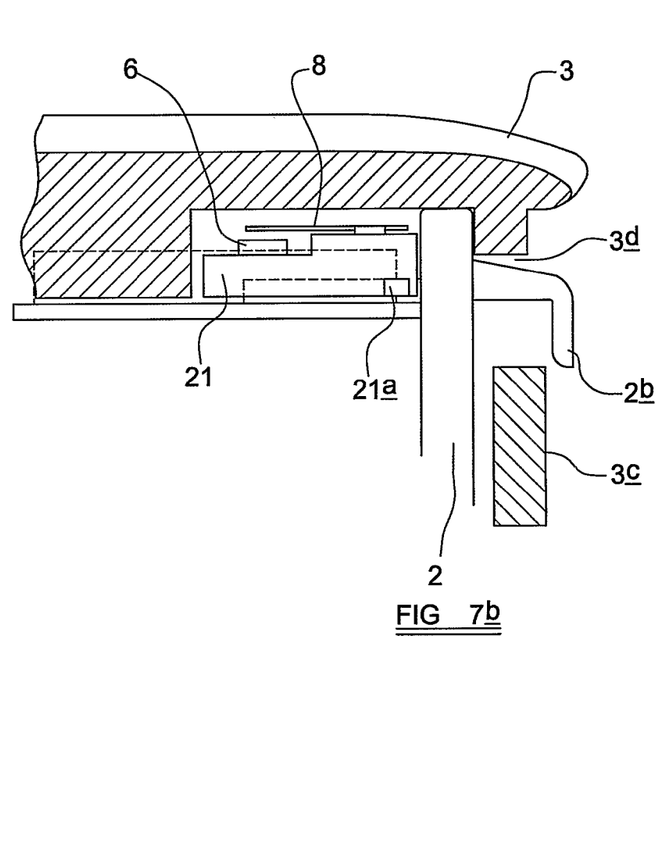

Thus, in the case where it is specifically desired to un-hook the cover 3 from the housing 2, sufficient downward force (greater than any force associated with normal operation of the vehicle horn) may be applied to the cover 3 to compress the coil spring 17 between the cover 3 and the housing 2 (after the horn contacts 6,9 are initially closed), thereby forcibly rotating the elongate element 15, about the pivot point 16, into an assembly position as shown in FIG. 7b. In the assembly position shown in FIG. 7b, it is to be noted that the lower edges of the apertures 3d have been moved to a position whereby they no longer obstruct the lower edges of the respective hook elements 2b, and the hook elements 2b may therefore be withdrawn through the respective apertures 3d to un-hook the cover 3 and housing 2 from one another. Un-hooking of the cover 3 and housing 2 in this manner allows disconnection of the cover 3 from the housing 2.

It is to be appreciated that, although the operation of the safety arrangement shown in FIG. 4 has been described with reference to disconnecting the cover 3 and housing 2, the safety arrangement shown in FIG. 4 would equally permit convenient assembly of the cover 3 to the housing 2.

Thus, where it is desired to mount the cover 3 to the housing 2, the cover 3 may first be resiliently mounted on the housing 2 by locating the underside 18 of the cover 3 on the respective resilient arm 8, such that the cover 3 "floats" on the housing 2. The cover 3 may then be depressed towards the housing 2 in the manner described above, using sufficient force to forcibly rotate the elongate element 15 into the assembly position, whereby the cover 3 and housing 2 may be conveniently hooked to one another (via hook elements 2b and apertures 3d). Once the cover 3 and housing 2 have been hooked to one another, the cover may then be released to adopt the position shown in FIG. 5a, after which time the safety arrangement may be operated in accordance with FIGS. 5a and 5b, as set out above. Here it is to be noted that, due to the moveable stop (in this case the rotatable elongate element 15), the cover 3 and housing 2 can be mounted to one another with the horn assemblies 4 already assembled and mounted to the housing, thereby preventing the need to build the horn assembly in situ after hooking of the cover 3 to the housing 2.

Figure 6:
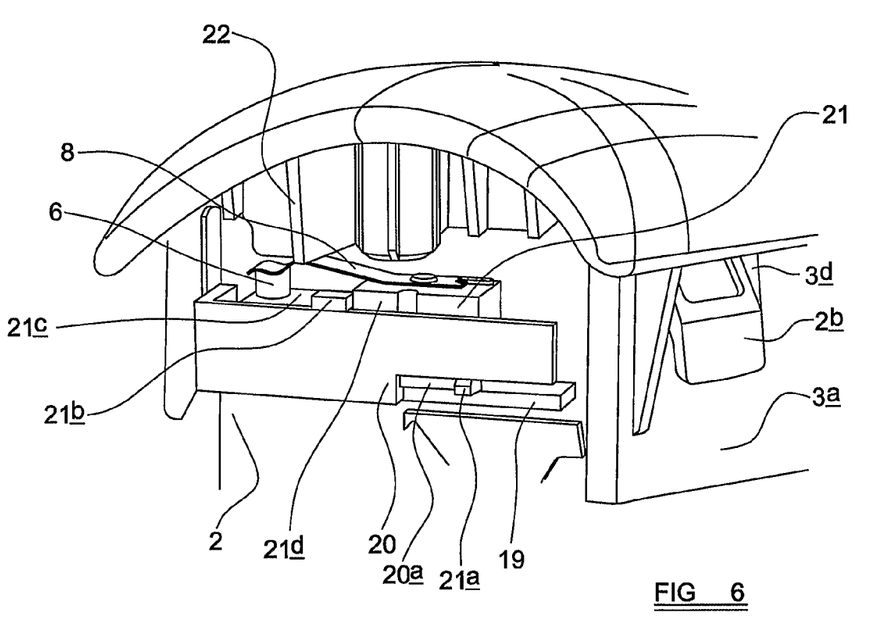
FIG. 6 is a perspective view showing a further embodiment of a safety arrangement according to the present invention.

FIG. 6 shows an alternative embodiment of a safety arrangement in accordance with the present invention, wherein the stop is mounted for lateral movement between an operable position and an assembly position. The embodiment shown in FIG. 6 is similar in some respects to the embodiment already described with reference to FIGS. 1 to 5, and for clarity the same reference numerals have therefore been used to denote common features.

Thus, referring to FIG. 6, the housing 2 incorporates a generally flat support platform 19. A guide panel 20 extends upwardly from the outer peripheral edge of the platform 19, the guide panel 20 being generally rectangular in shape and incorporating a guide channel 20a cut from its lower edge, adjacent the peripheral outer edge of the platform 19.

A generally box-shaped carriage 21 is slidably mounted on the platform 19 by means of a key portion 21a slidably received within the guide channel 20a, and a bearing portion 21b, which slidably engages with the upper edge of the guide panel 20.

The carriage 21 incorporates a stepped upper surface comprising a generally horizontal lower tier 21c and a generally horizontal upper tier 21d. A horn contact 6 is fixedly mounted on the lower tier 21c of the carriage, the horn contact 6 being connected to a horn activation circuit (not shown) by means of a wire (not shown).

A resilient arm 8 is fixedly mounted on the upper tier 21d, the resilient arm 8 extending generally horizontally over the lower tier 21c and terminating at a free end 8a spaced directly above the first horn contact 6. The resilient arm 8 carries a second horn contact 9, mounted to the free end 8a of the resilient arm 8, the second horn contact 9 being connected to the aforementioned horn activation circuit by means of a wire (not shown).

Still referring to FIG. 6, the resilient arm 8 directly supports the underside 22 of the cover 3. Thus, the cover 3 is resiliently mounted on the housing 2 where a plurality of resilient arms 8 is provided (each corresponding to a respective one of a plurality of horn assemblies), the cover 3 will effectively 'float' directly on the corresponding plurality of resilient arms.

Turning to FIGS. 7a and 7b, the operation of the safety assembly shown in FIG. 6 will now be described. FIGS. 7a and 7b are intended only as schematic representations illustrating operation of the safety arrangement in accordance with the present invention. Thus, certain features shown in FIG. 5 have been greatly simplified or stylized for clarity.

Referring first of all to FIG. 7a, the safety arrangement is shown, in part, prior to depression of the cover 3 to activate the horn, with the carriage 21 in an operable position, in which the underside 22 of the cover 3 is resiliently mounted on the resilient arm 8.

Upon resilient depression of the cover 3, the underside 22 of the cover 3 presses down on the resilient arm 8, bending the resilient arm 8 downwardly to move the horn contact 9 into engagement with the horn contact 6, thereby closing the horn contacts 6,9 and activating the horn.

It will be appreciated once again that depression of the cover 3 to close the horn contacts 6,9 will not be sufficient to allow unhooking of the cover 3 and housing 2 (as the hook elements 2b are obstructed by the lower edge of the respective apertures). Moreover, it will be appreciated that, with the carriage 21 in the operable position shown in FIG. 5a, the carriage 21 will effectively act as a stop which arrests relative movement of the cover 3 towards the housing 2 so as to prevent un-hooking of the cover 3 from the housing 2. In particular, it is noted that the carriage 21 is mounted for movement perpendicular to the axis of depression of the cover 3, so that carriage 21 will assist movement of the cover 3 towards the housing even if a relatively large pressing force is accidentally applied to the cover.

FIG. 7b illustrates operation of the safety arrangement to specifically allow un-hooking of the cover 3 from the housing 2.

Thus, where it desired to un-hook the cover 3 from the housing 2, the carriage 21 is slidingly moved from the operable position shown in FIG. 5a to the assembly position shown in FIG. 7b, whereby the cover 3 is free to move downwardly towards the housing 2, as shown in FIG. 5b. With the cover 3 in the position illustrated in FIG. 7b, the hook elements 2b can then be disengaged from the side wall 3c of the cover 3. Un-hooking of the cover 3 and housing 2 in this manner allows disconnection of the cover 3 from the housing.

A locking mechanism may be provided, for example in the form of catches 26, to lock the carriage 21 in either the operable or assembly position.

Again, it will be appreciated that, although the operation of the safety arrangement shown in FIG. 6 has been described with reference to disconnecting the cover 3 and housing 2, the safety arrangement shown in FIG. 6 would equally permit convenient assembly of the cover 3 to the housing 2.

Thus, where it is desired to mount the cover 3 to the housing 2, the carriage 21 may be moved into the aforementioned assembly position, and the cover 3 and housing 2 subsequently hooked together. Once the cover 3 and housing 2 have been hooked to one another, the carriage may then be moved into the aforementioned operable position, whereby the resilient arm 8 supports the cover 3, and cover 3 is resiliently mounted to the housing 2 after which time the safety arrangement may be operated in accordance with FIGS. 7a and 7b. Here it is to be noted that, due to the moveable stop (in this case the carriage 21), the cover 3 and housing 2 can be mounted to one another with the horn assemblies 4 already assembled and mounted to the housing, thereby preventing the need to build the horn assembly in situ after hooking of the cover 3 to the housing 2.

Figure 8A:
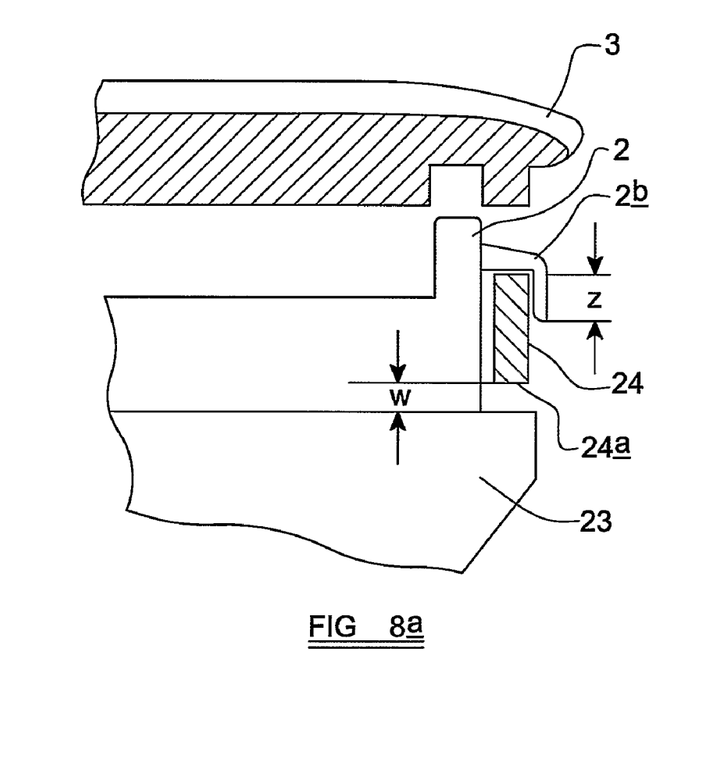
FIGS. 8A AND 8B are schematic, cross-sectional views showing part of a safety arrangement in accordance with a yet further aspect of the present invention.
Figure 8B:
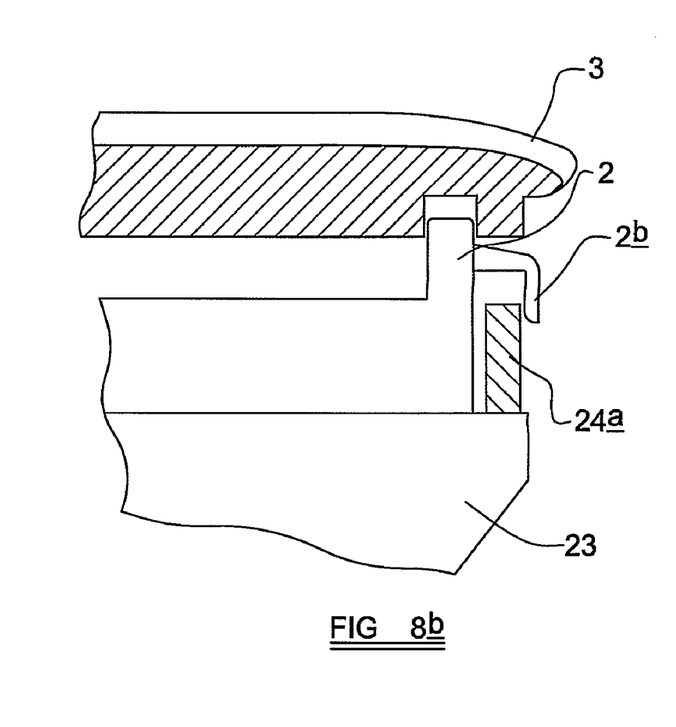

Referring now to FIGS. 8a and 8b, a safety arrangement according to the present invention may optionally be provided with an additional, secondary stop for preventing undesired un-hooking of the cover and housing. Specific features other than those associated with operation of the secondary stop have been omitted from FIGS. 8a and 8b for clarity, but it will be appreciated, for example, that the secondary stop may optionally be incorporated into any of the embodiments described above.

Thus, referring to FIG. 8a, the housing 2 is shown mounted to a steering wheel frame 23. The cover 3 is provided with a side wall 24 (which may correspond to the side wall 3c described above) extending downwardly alongside the housing 2 and terminating in a lower edge 24a.

It will be appreciated, referring to FIG. 8a, that the distance w between the lower edge 24a and the steering wheel frame 23, whilst being selected so as to allow movement of the cover towards the housing to close the associated horn contacts is less than the distance z between the lower edge of the hook element 2b and the lower edge of the apertures 3d (of which only one is shown in FIG. 8a). In this manner, it will be appreciated that upon depression of the cover 3, the lower edge 24a will abut against the steering wheel frame 23 (arresting movement of the cover 3 towards the housing 2) before the lower edge of the hook elements 2b can clear the lower edge of the respective apertures 3d. In this manner, the lower edge 24a is spaced above the mounting base 2a so as to act as a secondary stop, when the housing 2 is mounted to the steering wheel frame 23, by abutting against the steering wheel frame 23 as the cover 3 is depressed towards the housing 2.

On the other hand, once the housing is removed from its mounting position on the steering wheel frame 23, the lower edge 24a will be free to move beyond the mounting base 2a, whereby the cover 3 and housing 2 may be disconnected from one another in the usual manner, for example in the manner described with reference to any of FIGS. 1 to 7.

A secondary stop may be particularly desirable where the (primary) stop is biased against axial movement along the direction of depression of the cover (for example cylindrical element 11 or carriage 21), but is not locked, in which case even if the cover is accidentally pressed with sufficient force to move the (primary) stop, the secondary stop will still act to prevent unhooking of the cover and housing.

It will be appreciated that various modifications may be made to the embodiments described above, without departing from the present invention.

In particular, the cover and housing may be hooked to one another in all manner of alternative ways, provided the hooking prevents disconnection of the cover and housing. Thus, for example, the hook elements might alternatively be attached to the cover, whilst the housing might incorporate the respective apertures for engaging the hook elements. In such circumstances, it will be appreciated that the hook elements will be upwardly directed.

Similarly, the stop might alternatively be mounted on the housing (for example in the case of the retractable cylindrical element 11, in which case the horn contacts 6,9 and resilient arm 8 would be fixedly mounted to the cover 3) or the cover (for example in the case of the elongate element 15 or carriage 21).

Furthermore, the cover 3 need not be resiliently mounted on the resilient arm 8, but may in fact 'float' on a separate resilient mounting means, for example a separate coil spring or set of coil springs.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A safety arrangement comprising:
   an airbag housing for mounting to a steering wheel frame;
   a cover being resiliently mounted on the housing and spaced therefrom such that the cover may be depressed towards the housing to close a a pair of horn contacts for actuating a vehicle horn, the housing and cover further being hooked to one another for preventing subsequent disconnection of the cover from the housing upon release of the cover to open the horn contacts; and
   a stop mounted to the one of the cover and the housing for movement between a operable position, in which the stop arrests relative movement of the cover and housing towards one another so as to prevent un-hooking of the cover from the housing, and an assembly position, in which the cover may be depressed sufficiently far towards the housing to allow un-hooking of the cover from the housing and consequent disconnection of the housing and cover upon release of the cover.

2. The safety arrangement according to claim 1, wherein a side wall of one of the cover and housing is provided with one or more apertures, and the other of said housing and cover is provided with a respective number of hook-shaped elements configured to engage with an edge of the respective aperture to hook the housing and cover to one another.

3. The safety arrangement according to claim 1, wherein one of said horn contacts is carried on a resilient arm fixedly mounted with respect to the housing, the cover being supported on the resilient arm, whereby the cover is resiliently mounted to the housing, the resilient arm being configured such that, upon depression of the cover the resilient arm is pressed towards the housing to close said horn contacts, said resilient arm further acting to open the horn contacts upon release of the cover, thereby forcing the cover away from the housing.

4. The safety arrangement according to claim 1, wherein the stop is biased towards said operable position.

5. The safety arrangement according to claim 4, wherein the stop is biased by means of a coil spring.

6. The safety arrangement according to claim 1, wherein the stop is mounted for lateral movement between said operable and assembly positions.

7. The safety arrangement according to claim 6, wherein the stop is slidably mounted to the cover or housing for lateral sliding movement between said operable position and said assembly position.

8. The safety arrangement according to claim 7, wherein the stop is in the form of a carriage slidably mounted to the housing for lateral sliding movement between said operable position and said assembly position, a first horn contact being mounted on the carriage.

9. The safety arrangement according to claim 8, wherein the other of said horn contacts is carried on a resilient arm fixedly mounted to the carriage, the resilient arm supporting said cover when said carriage is in the operable position, whereby the cover is resiliently mounted to the housing, the resilient arm being configured such that, upon depression of the cover with the carriage in said operable position, the resilient arm is pressed towards the housing to close said horn contacts, said resilient arm further acting to open the horn contacts upon release of the cover, thereby forcing the cover away from the housing.

10. The safety arrangement according to claim 1, wherein the stop is mounted for movement along the axis of depression of said cover.

11. The safety arrangement according to claim 10, wherein the stop is biased toward said operable position to arrest relative movement of the cover towards the housing upon depression of the cover during normal operation to activate said vehicle horn, the strength of said biasing nevertheless allowing relative movement of the cover and housing toward one another, upon sufficient application of force to depress the cover, whereby the stop may be forcibly moved into said assembly position, against said biasing, for disconnection of the cover and housing.

12. The safety arrangement according to claim 11, wherein said stop is in the form of a retractable actuator element mounted to one of said housing or cover, the retractable actuator element being biased towards a non-retracted operable position projecting between the housing and cover, and forcibly retractable into the assembly position, against the action of said bias.

13. The safety arrangement according to claim 12, wherein the actuator element is mounted to the cover and biased towards said non-retracted position by means of a coil spring, one of said horn contacts being carried on a resilient arm fixedly mounted to the housing, the actuator element being supported on the resilient arm, whereby the cover is resiliently mounted to the housing, the resilient arm being configured such that, upon depression of the cover the resilient arm is pressed towards the housing by the actuator element to close said horn contacts, said resilient arm further acting to open the horn contacts upon release of the cover, thereby forcing the actuator element and cover away from the housing.

14. The safety arrangement according to claim 13, wherein the stop is in the form of an abutment member pivotally mounted to the housing, the abutment member being biased towards said operable position, and forcibly pivotable into said assembly position, against the action of said bias.

15. The safety arrangement according to claim 14, wherein the abutment member is biased towards said operable position by means of a coil spring, one of said horn contacts being carried on a resilient arm fixedly mounted to the abutment member, the cover being supported on the resilient arm whereby the cover is resiliently mounted to the housing, the resilient arm being configured such that, upon depression of the cover the resilient arm is pressed towards the housing by the cover to close said horn contacts, said resilient arm further acting to open the horn contacts upon release of the cover, thereby forcing the cover away from the housing.

16. The safety arrangement according to claim 10, wherein the housing incorporates a mounting base, remote from said cover, for mounting the arrangement to a given steering wheel frame, the cover incorporating a side wall which extends downwardly alongside the airbag housing and terminates at a lower edge, said lower edge being spaced a distance above the mounting base such that, when the arrangement is mounted to the steering wheel frame, said lower edge of said side wall acts as a secondary stop by abutting against the steering wheel frame upon sufficient depression of the cover towards the housing, thereby preventing said un-hooking of the cover and housing.

17. The safety arrangement according to claim 1, wherein the arrangement further comprises a locking mechanism for locking the stop in said operable position.

18. A method of assembling a safety arrangement comprising an airbag housing for mounting to a steering wheel frame, a cover and a pair of horn contacts for actuating a vehicle horn, the method comprising:
a) providing one of said housing or cover with a moveable stop;
b) with the stop in an assembly position, hooking the cover to the housing to prevent disconnection of the cover from the housing; and
c) subsequently moving the stop into an operable position wherein, with the stop in said operable position, the cover is resiliently mounted to the housing for depression towards the housing to close the horn contacts, wherein the stop nevertheless arrests relative movement of the cover and housing towards one another so as to prevent un-hooking of the cover from the housing.

19. A safety arrangement assembled in accordance with the method of claim 18.

* * * * *